Jan. 23, 1940.   J. E. DUBE   2,188,177
PRESSURE INDICATING DEVICE
Filed Feb. 23, 1937   2 Sheets-Sheet 1
Fig. 1.
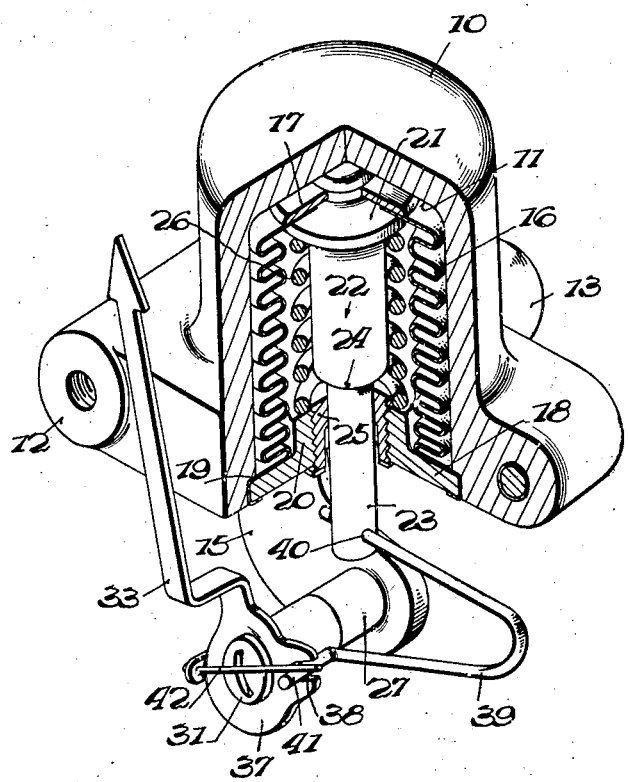
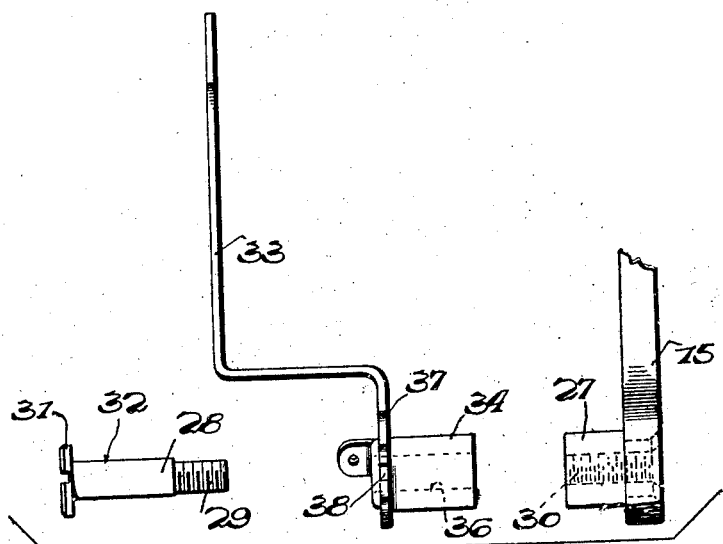
Fig. 2.
Inventor
John E. Dube.
By Cameron, Kerkam & Sutton.
Attorneys Jan. 23, 1940.  J. E. DUBE  2,188,177
PRESSURE INDICATING DEVICE
Filed Feb. 23, 1937  2 Sheets-Sheet 2

Inventor
John E. Dube.
By Cameron, Kerkam & Sutton.
Attorneys

Patented Jan. 23, 1940

2,188,177

UNITED STATES PATENT OFFICE 2,188,177

PRESSURE INDICATING DEVICE

John E. Dube, Knoxville, Tenn., assignor to The Fulton Sylphon Company, Knoxville, Tenn., a corporation of Delaware Application February 23, 1937, Serial No. 127,220

8 Claims. (Cl. 73—110)

This invention relates to pressure indicating devices whether used as a pressure gauge or as the pressure indicating means of a temperature responsive device which develops pressures in proportion to the temperatures being measured.

It is an object of this invention to provide a pressure indicating device which is simple in construction and accurate in operation.

Another object of this invention is to provide a device of the type characterized which employs as a pressure responsive member a bellows which is in reentrant or telescopic relation with a surrounding rigid wall whereby the chamber containing the pressure fluid is external with respect to the bellows and increase of pressure is effective to compress or collapse the bellows rather than extend or elongate the same.

Another object of this invention is to provide a device of the type last characterized with means whereby the extent to which the bellows may be compressed is rigidly limited so as to prevent injury to the instrument in the presence of an excess pressure.

Another object of this invention is to provide a pressure indicating device with readily adjustable means between the pressure responsive member and the indicating mechanism to compensate for differences in resiliency of different pressure responsive members.

Another object of this invention is to provide a device of the type characterized which may be readily employed as a temperature indicator by association with means for developing pressures in proportion to the temperature.

Other objects of this invention will appear as the description thereof proceeds.

The invention is capable of receiving a variety of mechanical expressions, one of which is shown on the accompanying drawings, but it is to be expressly understood that the drawings are for purposes of illustration only, and are not to be construed as a definition of the limits of the invention, reference being had to the appended claims for that purpose.

Referring in detail to the drawings wherein like reference characters are employed to designate corresponding parts in the several figures, Fig. 1 is a perspective view, with parts cut away to show the interior mechanism, of a pressure indicating device embodying the present invention;

Fig. 2 is a fragmentary view, with parts in disconnected relationship, to show the manner in which the movable pointer is mounted;

Figure 4:
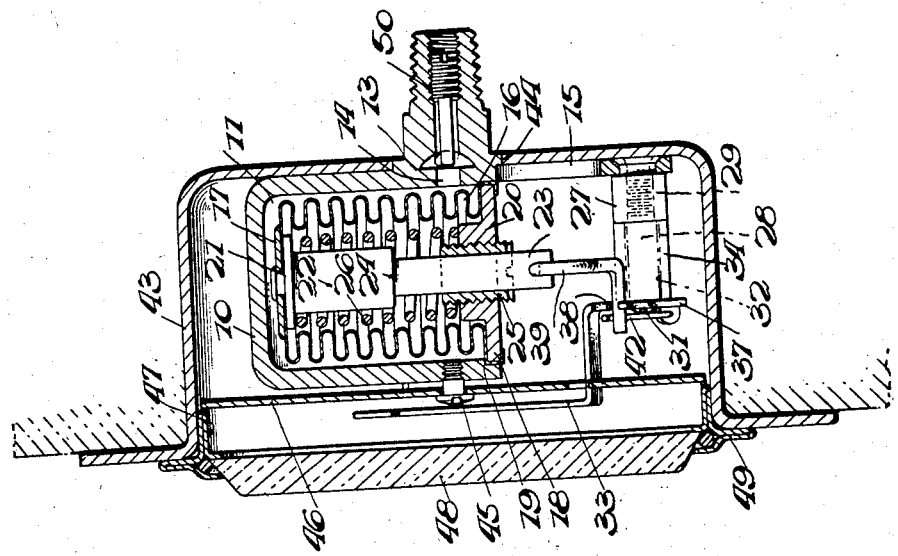
Fig. 4 is a cross section of the same embodiment but on a plane taken at right angles to the plane of Fig. 3.
Figure 3:
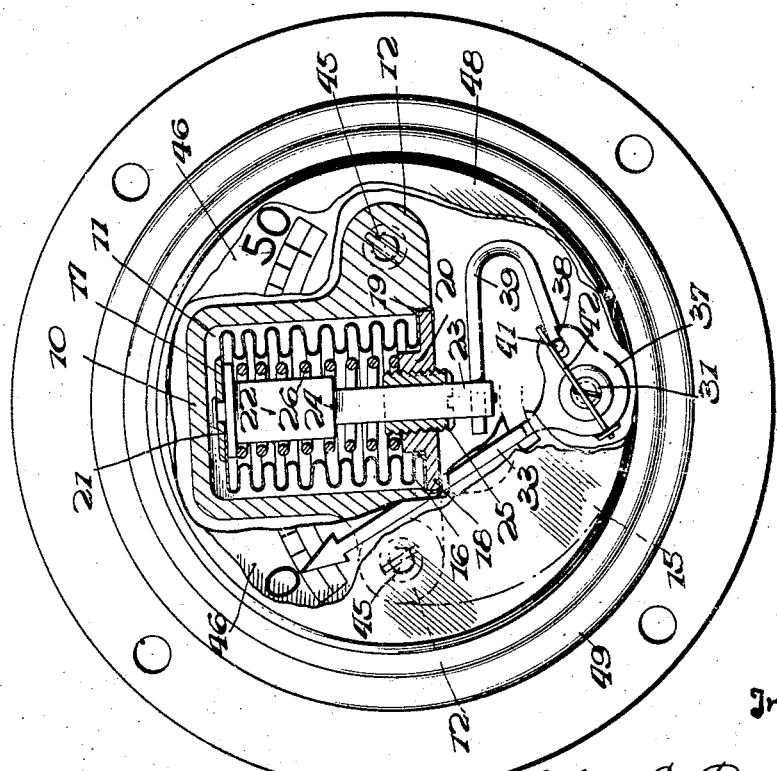
Fig. 3 is a cross section through an embodiment of the present invention on a plane taken parallel to the face of the instrument.

In the form shown, the pressure indicating device includes a generally cup-shaped frame 10, which may be of any suitable size, construction and material and which provides interiorly thereof a generally cylindrical chamber 11. Said frame has laterally extending apertured lugs 12 by which said frame may be suitably mounted in position, a rearwardly extending tubular boss 13 which contains a passage communicating with the interior of the chamber 11 through opening 14, and a laterally extending arm or projection 15 to provide a support for the stud or arbor on which the pointer is mounted as hereinafter explained.

Suitably mounted within said chamber 11 so as to be reentrant therein and in telescopic relation therewith is a bellows 16 of any suitable construction, material, number of folds, etc., the same having a movable end wall 17 integral therewith or suitably attached thereto. The opposite end of said bellows 16 is attached in any suitable way to a rigid member 18 which also preferably is so formed as to constitute a closure for the open end of the chamber 11, the same being held in position at the open end of the chamber 11 in any suitable way, as by soldering or brazing. As shown, the wall of the chamber is recessed at 19 to receive said closure member 18. Member 18 is also provided with an inwardly directed flange or sleeve 20 which is interiorly threaded for a purpose to be explained.

Secured in any suitable way to movable end wall 17, as by the flanged enlargement 21, is a stem 22 shown as reduced in diameter at 23 so as to provide a shoulder 24. Threadedly mounted in the opening in the flange or sleeve 20 is an adjustable hollow plug or sleeve 25 whose inner end is adapted to be engaged by said shoulder 24 and thereby limit rigidly the extent to which the bellows can be compressed by the fluid within the chamber 11. Interposed between the tubular flange 20 and the flange 21 is a coil spring 26 which, together with the resiliency inherent in the bellows 16, opposes collapse of said bellows.

Referring more particularly to Fig. 2, the laterally extending arm 15 is provided, adjacent its extremity, with an interiorly threaded tubular boss 27 which may be integral with said arm or, as shown, be held in position thereon by extending a portion of reduced diameter through an aperture in the arm and swaging, staking, upsetting, or otherwise suitably securing the same in said aperture. Mounted in the threaded aperture of said boss 27 is a stud or arbor 28 having a threaded extremity 29 adapted to be threaded into the aperture 30 in the boss 27. Between the threaded portion 29 and the head 31, which may be kerfed for convenience of manipulation, said stud or arbor has a cylindrical surface 32 which is adapted to constitute a bearing for the pointer next to be described.

The pointer 33 has suitably secured to its outer extremity a tubular sleeve or boss 34, the same being shown as provided with an extension of reduced diameter that is passed through an aperture in the end of the pointer and then swaged, upset, staked, or otherwise suitably secured therein, although the same if preferred may be formed in one piece with the pointer. The diameter of the aperture 36 through said boss 34 is such as to make proper bearing contact with the cylindrical portion 32 of the stud or arbor 28, the length of said boss 34 being such that when said stud or arbor is in position the pointer is held against endwise movement by engagement of said boss between the boss 27 on the frame and the head 31 on said stud or arbor.

As shown, the end of the pointer at its mounting is enlarged so as to provide a laterally extending flange 37 which is provided with a radially extending slot 38. Introduced between the stem 22 and the pointer 33 is a generally U-shaped link in the form of a bendable rod 39 suitably attached to the stem 22, as by passage through an aperture 40 therein, and having its opposite end bent laterally as shown at 41 and engaged in said slot 38. Therefore, rectilinear movements of the stem 22 are transmitted to an eccentric portion of the pointer 33 so that rotation of the latter around its axis is effected with a multiplication of movement at the free end of the pointer. In order to prevent play of the laterally extending portion 41 of the rod 39 in said slot 38, and to hold said laterally extending portion 41 always against the same side of said slot 38, a light spring 42 is maintained in any suitable way on said pointer and bears against the forwardly extending extremity of said portion 41 with a light tension.

The bendable rod 39 provides a calibrating means so that variations in the resiliency of the bellows 16 and the coil spring 26 may be compensated for. Thus, if either or both the bellows or the spring are within manufacturing tolerances stiffer than the average, the rod 39 may be bent so that its portion 41 will engage the slot 38 somewhat closer to the axis of the pointer, or if either or both the bellows or the spring are more flexible than the average, said rod 39 may be bent so as to engage its portion 41 with the slot 38 at a point more remote from the axis of the pointer. Thereby, in assembling the instrument, the rod 39 may be so engaged with the slot 38 that equal increments of pressure acting on the bellows 16 will produce equal increments of movement at the free or indicating end of the pointer 33 to the end that a standard dial may be used notwithstanding variations of resiliency within manufacturing tolerances.

The structure as so far described may be mounted in any suitable way in a casing 43 of any suitable character and construction. As shown, said casing has an aperture 44 in its rear wall through which the boss 13 projects, and the frame 10 as here shown is secured to said casing 43 by a pair of screws 45 passing through the apertures in the lugs 12. Mounted in said casing in front of the frame 10 is a dial plate 46 of any suitable character and calibrated in any suitable way, the pointer 33 being shown as bent forwardly and upwardly so as to be in proper relationship to said dial plate, with its end suitably related to the indicia thereon. Said dial plate may be held in position in any suitable way as by a clamping ring 47. The face of the casing is preferably closed by a crystal 48 which may be held in position in any suitable way as by clamping the same between said ring 47 and a bezel 49.

The source of pressure which is to be measured is connected in any suitable way with the passage in boss 13, so that the fluid under pressure enters the chamber 11 in the space between the wall thereof and said bellows 16. The pressure is thus applied to said bellows exteriorly thereof and variations of pressure cause movement of said bellows, increases of pressure collapsing said bellows against the inherent resiliency thereof and the resilient opposition of the spring 26, and decreases of pressure resulting in the bellows expanding under the action of its inherent resiliency and said spring 26. Movements of the end wall 17 are transmitted through the stem 22 and rod 39 to the flange 37 at the pivoted end of the pointer, but eccentric with respect to the axis of the latter, and therefore variations in pressure in said chamber 11 are magnified by the movement multiplying mechanism and accurately indicated by the relationship of the free end of the pointer 33 to the indicia on the dial 46. In order to dampen fluctuations of pressure and prevent the pointer vibrating under such fluctuations a suitable restriction plug 50 may be mounted in the passage 14 so that pressure pulsations are suitably minimized or suppressed.

As will be apparent, the structure as so far described may be used wherever it is desired to measure the pressure of a fluid, the stiffness of the bellows 16 and spring 26 being suitably selected with respect to the magnitude of the pressures to be measured. The pressure indicating device may be also used as a temperature indicating means, it being assumed that the dial 46 is properly calibrated to indicate temperature, by connecting the passage in boss 13 to a source of pressure which varies with the temperature.

It will therefore be perceived that by the present invention a pressure indicating device has been provided which is relatively simple in construction and accurate in operation. The pressure responsive member is in the form of a bellows which is disposed in reentrant or telescopic relationship with respect to a surrounding rigid chamber so that the pressure fluid is applied to the bellows exteriorly of the same. At the same time means are provided for rigidly limiting the extent to which the pressure fluid may collapse said bellows. Means have also been provided whereby the instrument may be readily calibrated to compensate for variations due to manufacturing tolerances in the resiliency of the bellows and of its cooperating spring. The pressure indicating device may also be readily used for indicating temperature by suitably calibrating the dial thereof, and as the instrument is composed of relatively few easily manufactured parts it can be readily standardized for production. The device is also strong and rugged and can be made of any suitable size and conditioned for operation with pressures of any suitable magnitude.

While the embodiment of the invention illustrated on the drawings has been described with considerable particularity, it is to be expressly understood that the invention is not restricted thereto, as the same may take a variety of mechanical expressions, some of which will now readily suggest themselves to those skilled in the art, while changes may be made in the details of construction, arrangement, proportion, material, etc., and certain features used without other features, without departing from the spirit of the invention. Reference is therefore to be had to the appended claims for a definition of said invention.

What is claimed is:

1. In a device of the character described, the combination of a frame provided with a chamber, a flexible member in said chamber, said chamber having an inlet to the space between said member and the wall of said chamber, a stem connected to said member and extending through an aperture in the wall of said chamber, means adjustably mounted in said aperture and surrounding said stem to rigidly limit the movement of said member in one direction, a pointer, and motion multiplying mechanism connecting said stem and said pointer.

2. In a device of the character described, the combination of a frame provided with a chamber, an expansible and collapsible member in said chamber, said chamber having an inlet to the space between said member and the wall of said chamber, a stem connected to said member, a pivotally mounted pointer provided with a flange, and a bent link connected to said stem and engaged with said pointer flange for operating said pointer, said link being bendable to engage said pointer flange at varying distances from the axis of said pointer.

3. In a device of the character described, in combination with a frame, a dial carried thereby, and a pivotally mounted pointer cooperating with said dial, an expansible and collapsible chamber provided in said frame, an inlet for pressure fluid to said chamber, a stem connected to the movable wall of said chamber and extending through an aperture in said frame, motion multiplying mechanism between said stem and said pointer, and a threaded sleeve in said aperture and cooperating with said stem for limiting the movement thereof in one direction.

4. In a device of the character described, in combination with a frame, a dial carried thereby, and a pivotally mounted pointer cooperating with said dial, a chamber provided in said frame, a bellows reentrantly arranged within said chamber and having its outer end hermetically sealed to said chamber to form an expansible and collapsible space therebetween, an inlet for pressure fluid to said space, a stem connected to the movable end wall of said bellows, means cooperating with said stem for rigidly limiting the movement in one direction of said movable end wall including a member surrounding said stem and adjustably mounted in said frame, and motion multiplying mechanism between said stem and said pointer.

5. In a device of the character described, in combination with a frame, a dial carried thereby, and a pivotally mounted pointer cooperating with said dial, a chamber provided in said frame, a bellows reentrantly arranged within said chamber and having its outer end hermetically sealed to said chamber to form an expansible and collapsible space therebetween, an inlet for pressure fluid to said space, a stem connected to the movable end wall of said bellows, a sleeve on said frame projecting inwardly with respect to said bellows and associated with the fixed end thereof, an adjustable member mounted on said sleeve and cooperating with a shoulder on said stem for rigidly limiting the movement in one direction of said movable end wall, and motion multiplying mechanism between said stem and said pointer.

6. In a device of the character described, in combination with a frame, a dial carried thereby, and a pivotally mounted pointer cooperating with said dial, an expansible and collapsible chamber provided in said frame, an inlet for pressure fluid to said chamber, a stem connected to the movable wall of said chamber, said pointer having a laterally extending slotted flange, and a bent and bendable link attached to said stem and having operative engagement with the slot of said flange eccentrically of the axis of said pointer.

7. In a device of the character described, in combination with a frame, a dial carried thereby, and a pivotally mounted pointer cooperating with said dial, a chamber provided in said frame, a bellows reentrantly arranged within said chamber and having its outer end hermetically sealed to said chamber to form an expansible and collapsible space therebetween, an inlet for pressure fluid to said space, a stem connected to the movable end wall of said bellows, said pointer having a laterally extending slotted flange, and a U-shaped bendable member connected to said stem and having engagement with the slot of said flange eccentrically of the axis of said pointer.

8. In a device of the character described, in combination with a frame, a dial carried thereby, and a pivotally mounted pointer cooperating with said dial, a chamber provided in said frame, a bellows reentrantly arranged within said chamber and having its outer end hermetically sealed to said chamber to form an expansible and collapsible space therebetween, an inlet for pressure fluid to said space, a stem connected to the movable end wall of said bellows, said pointer having a laterally extending slotted flange and a bent and bendable rod connected to said stem and adapted to engage the slot in said flange at different distances from the axis of said pointer.

JOHN E. DUBE.